(12) United States Patent
Lin

(10) Patent No.: US 7,308,774 B2
(45) Date of Patent: Dec. 18, 2007

(54) SOLAR INSECT KILLER AND CATCHER

(75) Inventor: Chin-Kuo Lin, Taipei (TW)

(73) Assignee: Aleague International Co., Taipei (TW)

( * ) Notice: Subject to any disclaimer, the term of this patent is extended or adjusted under 35 U.S.C. 154(b) by 0 days.

(21) Appl. No.: 11/325,536

(22) Filed: Jan. 5, 2006

(65) Prior Publication Data

US 2007/0151141 A1    Jul. 5, 2007

(51) Int. Cl.
*A01M 1/04* (2006.01)
(52) U.S. Cl. ..................................... 43/113
(58) Field of Classification Search ............ 43/112, 43/113
See application file for complete search history.

(56) References Cited

U.S. PATENT DOCUMENTS

| | | | | |
|---|---|---|---|---|
| 3,951,104 A * | 4/1976 | Neff | ........................ | 119/216 |
| 5,301,456 A * | 4/1994 | Jobin et al. | .................. | 43/113 |
| 6,112,453 A * | 9/2000 | Clarke, Jr. | ................... | 43/113 |
| 6,502,347 B1 * | 1/2003 | Carver, Sr. | ................... | 43/113 |
| 7,024,815 B1 * | 4/2006 | Visagie | ....................... | 43/113 |
| 2003/0192229 A1 * | 10/2003 | Wilbanks | .................... | 43/112 |
| 2006/0201052 A1 * | 9/2006 | Wilbanks | .................... | 43/113 |

* cited by examiner

*Primary Examiner*—Kurt Rowan

(57) ABSTRACT

A solar insect killer and catcher includes a casing, a solar plate, a power supply, a control switch, a timer, a circuit board and a plurality of light-emitting elements to emit the lights having various wavelengths. If a user intends to kill or catch the insects, he/she can prepare a water-collecting basin or dig a water-collecting pit outdoors. When the casing emits the lights having various wavelengths according to the preset timings, many kinds of insects can be attracted by the lights and then fly into the water-collecting basin or water-collecting pit. As a result, the insects cannot escape from the water collecting basin or water collecting pit and be captured therein.

6 Claims, 4 Drawing Sheets

SOLAR INSECT KILLER AND CATCHER

BACKGROUND OF THE INVENTION

1. Field of Invention

The present invention relates to a solar insect killer and catcher. In particular, the present invention employs a principle that the insects can be attracted by light sources having various wavelengths. A casing is provided with a plurality of light-emitting elements able to emit the lights having various wavelengths. With such arrangement, many kinds of insects can be attracted by the light sources having various wavelengths, and then fly into a preset water-collecting basin or water-collecting pit. When the insects falls into the water collecting basin or water collecting pit, they are captured and thus cannot escape from there.

2. Description of Related Art

In the ambient environment of daily life, there are many kinds of insects. Some insects are harmful to people. The major harmful insects in the house are mosquitoes. Since the mosquitoes can bite the human body, they are troublesome and make people intolerable. Further, some insects are harmful to the plants and thus such kinds of insects are also troublesome to farmers, flower farmers and fruit farmers because they will cause a certain degree of loss to the plants. No doubt, those harmful insects are a big trouble to the planting industry.

A general method for prevent those harmful insects is to use a mosquito catcher lamp. The mosquito catcher lamp employs the phototaxis and the sensitivity to specific wavelengths of the mosquitoes. Accordingly, the mosquitoes can be attracted by the light of a lamp tube and thus contact an electric net surface. As a result, the mosquitoes can be instantaneously burned by the high-volt electricity produced on the electric net. An electric mosquito racket also employs the similar principle. However, the mosquito catcher lamp may be potentially dangerous to the elders or children in the family because watching the lamp tube for a long time may cause the pathology of cataracts. Further, if the children curiously touch the electric net with their fingers, they will be struck by high-volt electricity. Further, turning on the mosquito catcher lamp for a long time will inevitably increase the expense of electricity. Even though the electric mosquito racket is powered by dry batteries, it is still possible that the user may accidentally touch the electric net.

Therefore, the above conventional devices really have some drawbacks and need to be improved.

In view of the drawbacks of the conventional mosquito catcher lamp, the inventor of the present invention thus provides a solar insect killer and catcher based on his expert experience and research.

SUMMARY OF THE INVENTION

The present invention is to provide a solar insect killer and catcher. The present invention employs a principle that insects will be attracted by light sources having various wavelengths. A casing is provided with a plurality of light-emitting elements able to emit the lights having various wavelengths. With such arrangement, many kinds of the insects can be attracted by the light sources having various wavelengths, and then fly into a preset water-collecting basin or water-collecting pit. When the insects fall into the water-collecting basin or water-collecting pit, they are captured and thus cannot escape from there.

Another, the present invention is to provide a solar insect killer and catcher, in which a solar plate is provided to transform the solar energy into electricity and the transformed electricity can be saved by a power supply. With the above arrangement, the present invention does not need to provide any external power supply.

Still another, the present invention is to provide a solar insect killer and catcher, which is simple in structure, easy to operate and low in cost.

Accordingly, the solar insect killer and catcher of the present invention comprises a casing, a solar plate, a power supply, a control switch, a timer, a circuit board and a plurality of light-emitting elements able to emit the lights having various wavelengths. The casing is transparent and hollow. The upper end of the inner wall surface of the casing is provided with a solar plate. The solar plate can receive the solar energy and then transform it into electricity. The solar plate is connected to the power supply for saving the electricity transformed by the solar plate. The power supply is connected to the control switch and the timer. The control switch and the timer are provided on the outer side of the casing, respectively. A supporting hook or supporting ring is provided at a proper position outside the casing for hanging the casing. Alternatively, a supporting frame, supporting net or supporting basket having a proper height can be provided. The circuit board is provided at a proper position in the casing. The bottom surface of the circuit board is provided with the plurality of light-emitting elements able to emit the lights having various wavelengths. The light-emitting elements can be turned on/off simultaneously or individually under the control of the timer. With the above components, the solar insect killer and catcher of the present invention can be obtained. When a user intends to kill or catch the insects, he/she only needs to turn on the switch to energize the light-emitting elements to emit the lights having various wavelengths. The timer can control the timing of the light-emitting elements to emit the lights. Finally, a water-collecting basin is provided or a water-collecting pit is dug outdoors. When the casing emits the lights having various wavelengths according to the preset timings, many kinds of insects can be attracted by the lights and then fly into the water-collecting basin or water-collecting pit. As a result, the insects cannot escape from the water collecting basin or water collecting pit and be captured therein.

These features and advantages of the present invention will be fully understood and appreciated from the following detailed description of the accompanying drawings.

DETAILED DESCRIPTION OF THE PREFERRED EMBODIMENT

Figure 1:
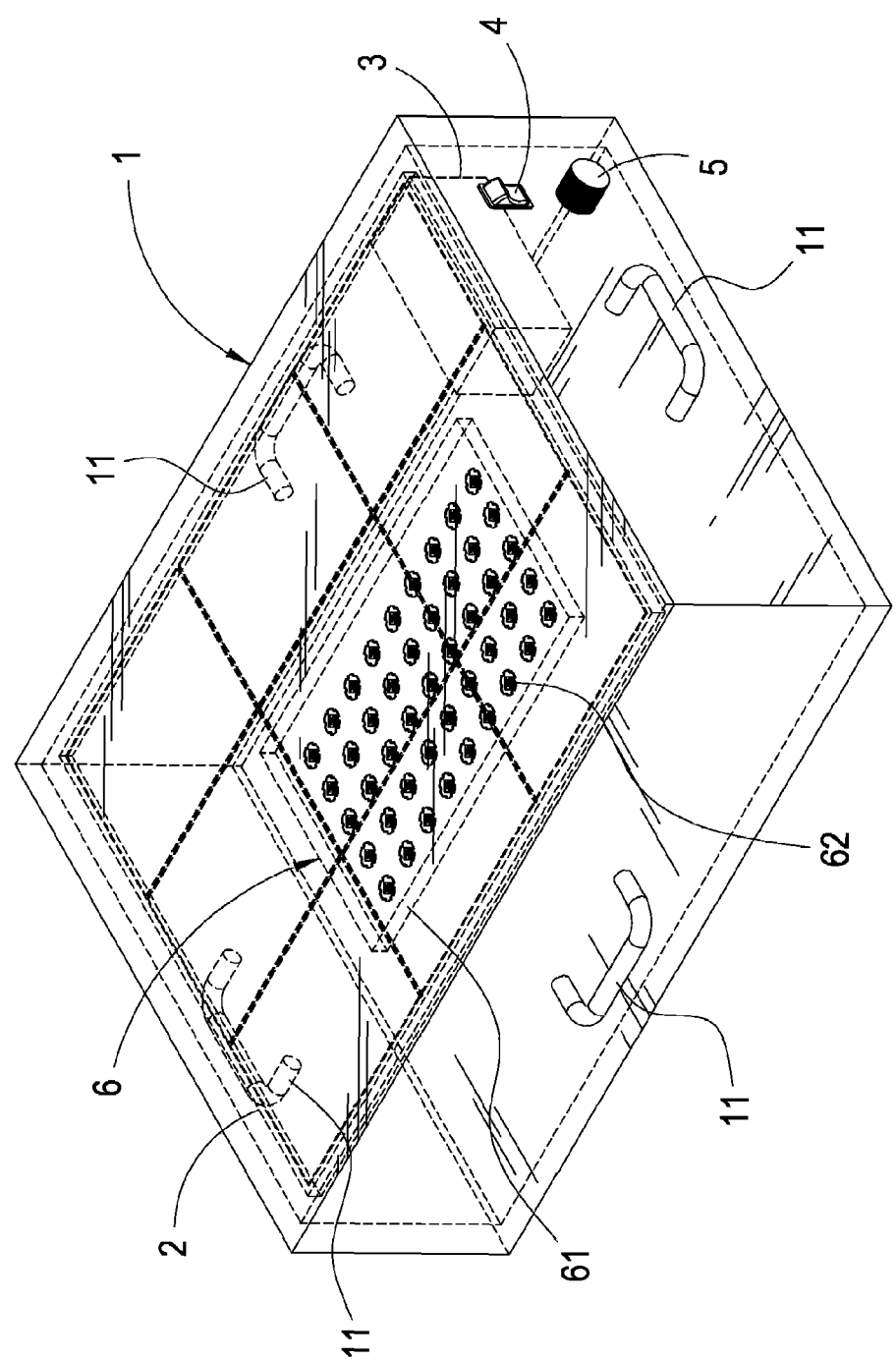
FIG. 1 is a perspective view showing a solar insect killer and catcher of the present invention.
Figure 2:
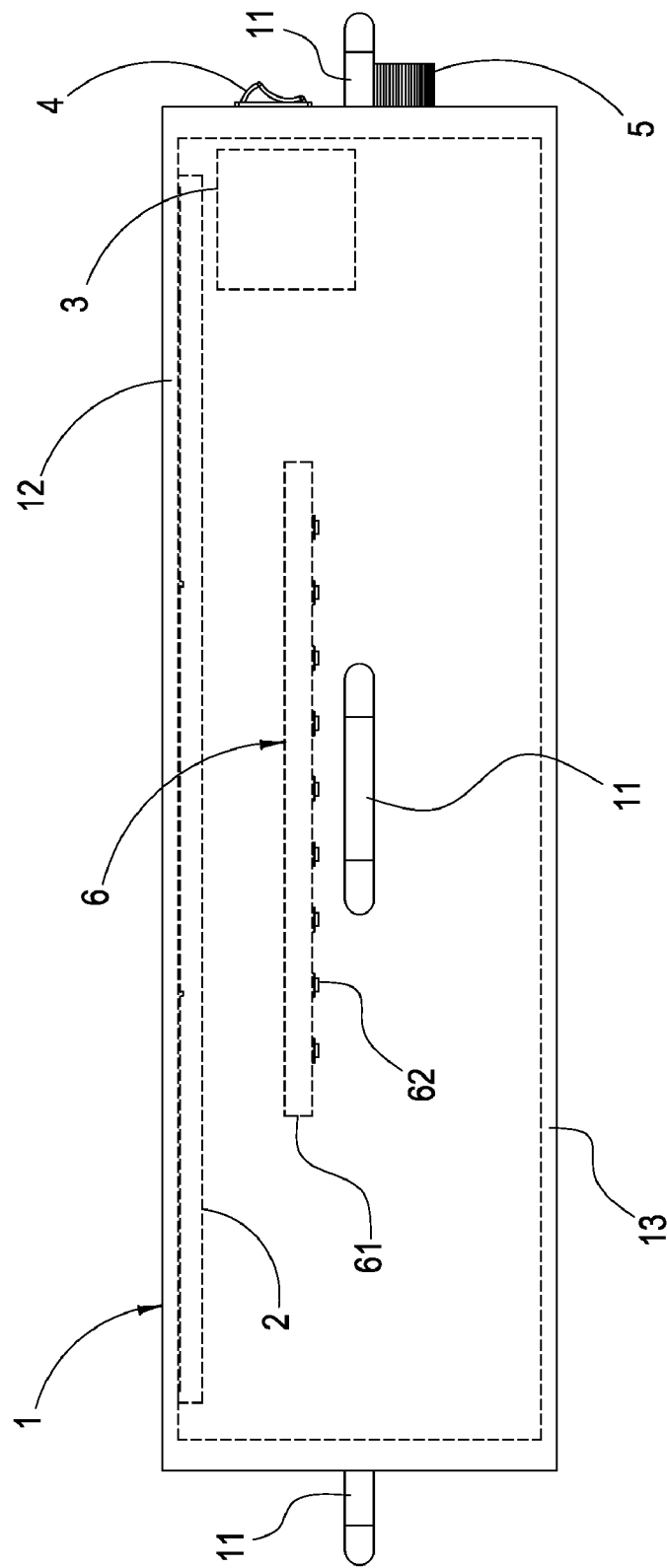
FIG. 2 is a side view of the solar insect killer and catcher of the present invention.

With reference to FIGS. 1 to 4, the solar insect killer and catcher of the present invention mainly comprises a casing 1, a solar plate 2, a power supply 3 a control switch 4, a timer 5 and a light-emitting device 6.

The casing 1 is transparent and hollow, which includes a transparent top surface 12 and a transparent bottom surface

13. A hanging portion 11 is provided at a proper position on the outer edge of the casing 1 for hanging the casing 1. Alternatively, a supporting frame, supporting net or supporting basket having a proper height can be provided. The hanging portion 11 can be a supporting hook, supporting ring or other structure for supporting.

The solar plate 2 is provided on the upper end of the inner wall surface of the casing 1. That is, the solar plate 2 is provided in the casing and attached to the transparent top surface 12. The solar plate 2 can receive the solar energy and then transform it into electricity.

The power supply 3 is provided in the casing 1 and connected to the solar plate 2. The power supply 3 can save the electricity transformed by the solar plate 2 and supply the electricity. The power supply 3 can be battery or other devices having reserved power.

The control switch 4 is provided on the outer surface of the casing 1 and connected to the power supply 3. The control switch 4 can control the operation of the light-emitting device 5.

The timer 5 is provided on the outer surface of the casing 1 and connected to the power supply 3. The timer 5 can control the timings of the light-emitting elements 62 to emit the lights having various wavelengths.

The light-emitting device 6 is provided at a proper position in the casing 1, and mainly comprises a circuit board 61. The bottom surface of the circuit board 61 is provided with a plurality of light-emitting elements 62 able to emit the lights having various wavelengths through the transparent bottom surface 13. The circuit board 61 is connected to the control switch 4 and the timer 5.

With the above components, the solar insect killer and catcher of the present invention can be obtained. When a user intends to kill or catch the insects, he/she only needs to turn on the control switch 4 to energize the light-emitting elements 62 to emit the lights having various wavelengths. The timer 5 can control the timings of the light-emitting elements 62 to emit the lights circularly. As a result, the light-emitting device 6 periodically changes the lights having various wavelengths.

Figure 3:
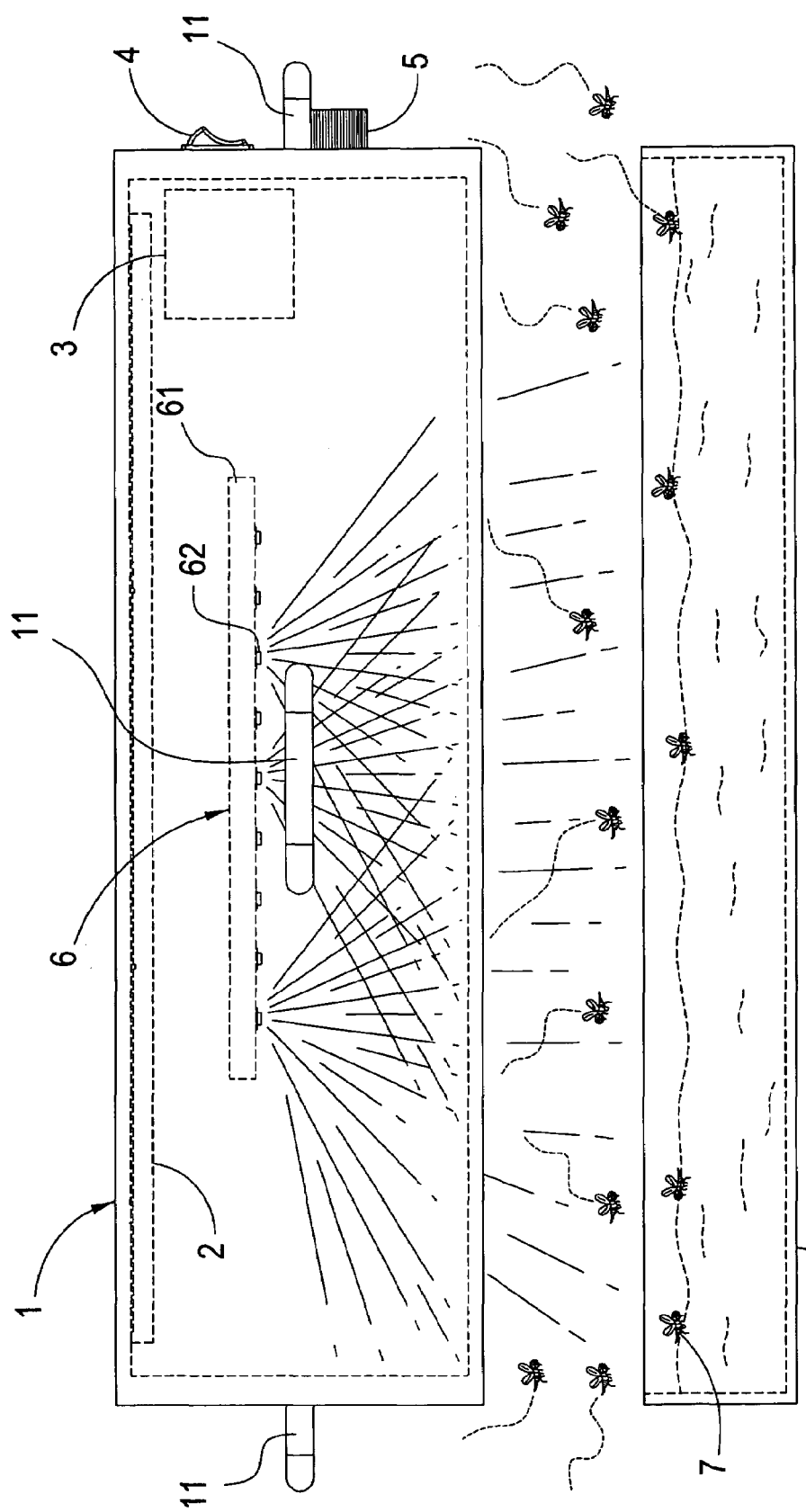
FIG. 3 is a view showing another embodiment of the solar insect killer and catcher of the present invention.

With reference to FIG. 3, it is a view showing another embodiment of the solar insect killer and catcher of the present invention. Since each kind of insects can be attracted by the light having specific wavelength, with providing the light-emitting elements 62 to emit the lights having various wavelengths in the casing 1, the user can preset the timing of each light-emitting element according to the species of the insects 7 to emit the lights having various wavelengths periodically from the casing 1 toward the ambient environment. Further, a water-collecting basin 8 is provided (or a water-collecting pit is dug) under the casing 1. At this time, many kinds of insects 7 fly into the light-emitting casing 1 and fall into the preset water-collecting basin 8 (water-collecting pit). Once the insects 7 are fallen into the water-collecting basin 8 (water-collecting pit), they are captured and thus cannot escape from there. Thus, the object for killing and catching insects can be effectively achieved.

Figure 4:
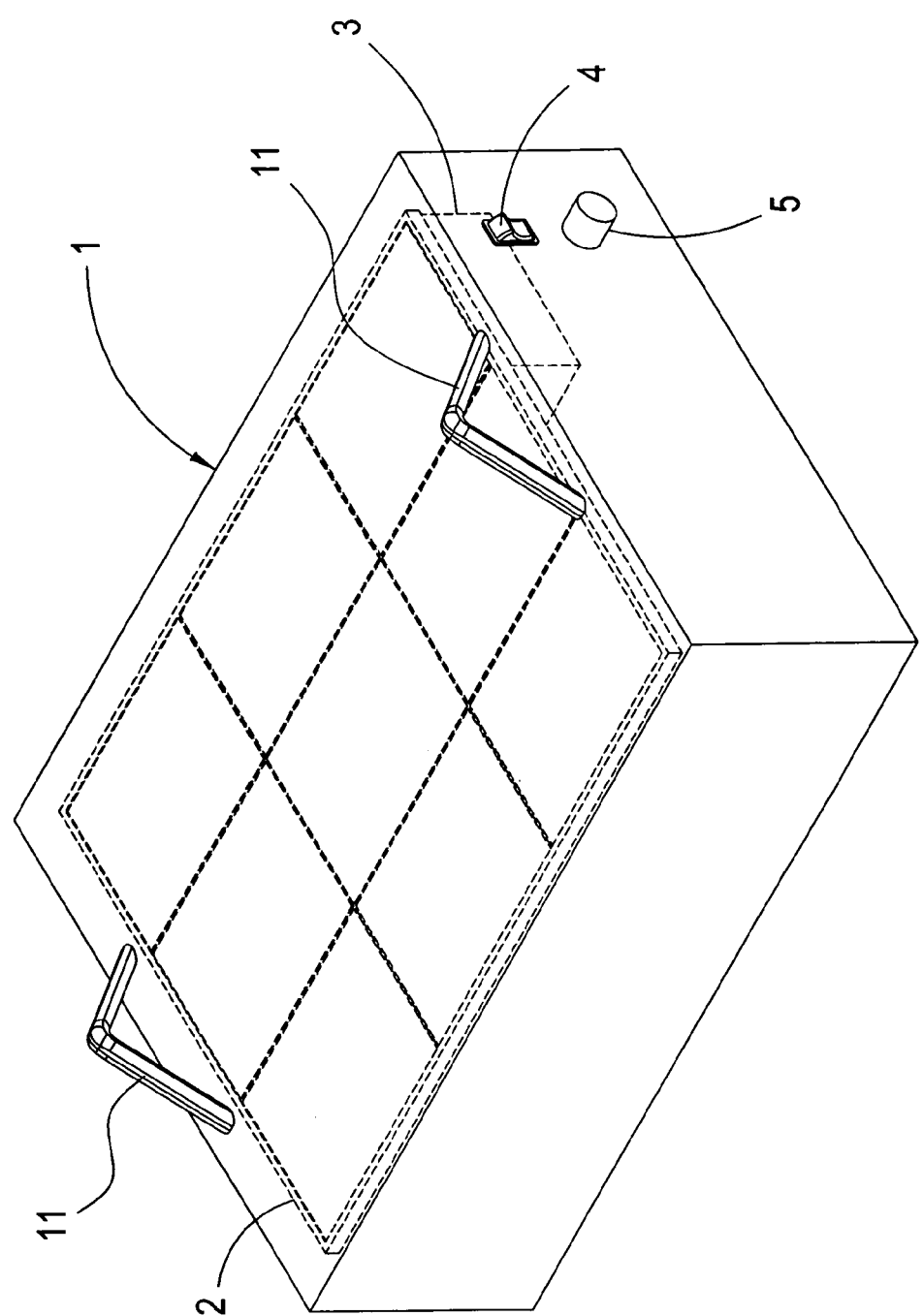
FIG. 4 is a view showing the operation of another embodiment of the solar insect killer and catcher of the present invention.

With reference to FIG. 4, it is a schematic view showing the operation of another embodiment of the solar insect killer and catcher of the present invention. The hanging portion 11 of the casing 1 can also be provided on the top surface of the casing 1 for hanging.

In comparison with the conventional art, the solar insect killer and catcher of the present invention has the following advantages:

(1) the present invention employs a principle that the insects can be attracted by light sources having various wavelengths. A casing is provided with a plurality of light-emitting elements able to emit the lights having various wavelengths. With such arrangement, many kinds of the insects can be attracted by the light sources having various wavelengths, and then fly into a preset water-collecting basin or water-collecting pit. When the insects fall into the water-collecting basin or water-collecting pit, they are captured and thus cannot escape from there.

(2) the present invention can provided a power supply. The solar plate is provided to transform the solar energy into electricity and the electricity can be saved by such a power supply. With the above arrangement, the present invention does not need to provide any external power supply (3) the present invention is to provide a solar insect killer and catcher, which is simple in structure, easy to operate and low in cost, facilitating the popularization of the present invention.

Many changes and modifications in the abovementioned embodiment of the present invention can, of course, be carried out without departing from the scope thereof. Accordingly, to promote the progress in science and useful arts, the present invention is disclosed and is intended to be limited only by the scope of the appended claims.

What is claimed is:

1. A solar insect killer and catcher, comprising:
   a hollow casing having a transparent top surface and a transparent bottom surface, wherein a hanging portion is provided at a predetermined position outside of the casing;
   a solar plate provided in the casing and attached to the transparent top surface;
   a power supply provided in the casing and connected to the solar plate;
   a light-emitting device provided in the casing and having a circuit board, wherein the bottom of the circuit board is provided with a plurality of light-emitting elements to emit lights having various wavelengths through the transparent bottom surface; and
   a timer provided on an outer side of the casing and connected to the circuit board for controlling timings of the light-emitting elements to emit the lights circularly so that the light-emitting device periodically changes the lights having various wavelengths to attract various insects.

2. The solar insect killer and catcher according to claim 1, wherein the solar plate receives solar energy and transforms the solar energy into electricity.

3. The solar insect killer and catcher according to claim 1, wherein the power supply saves electricity transformed by the solar plate and supplying the electricity.

4. The solar insect killer and catcher according to claim 1, wherein the power supply is a battery.

5. The solar insect killer and catcher according to claim 1, further comprising a control switch provided on an outer side of the casing and connected to the circuit board for controlling action of the light-emitting device.

6. The solar insect killer and catcher according to claim 1, further comprising a water-collecting basin or water-collecting pit provided under the casing for receiving fallen insects.

\* \* \* \* \*